United States Patent [19]

Yasuno

[11] Patent Number: 5,070,460

[45] Date of Patent: Dec. 3, 1991

[54] ANTI-SKID BRAKE CONTROL SYSTEM FOR AUTOMOTIVE VEHICLE SELECTIVE OF TWO WHEEL DRIVE MODE AND FOUR WHEEL DRIVE MODE AND TECHNOLOGY OF CORRELATION OF BRAKE CONTROL AND POWER TRAIN CONTROL FOR OPTIMAL BRAKING EFFICIENCY AND ENHANCED STABILITY

[75] Inventor: Yoshiki Yasuno, Kanagawa, Japan

[73] Assignee: Nissan Motor Company, Limited, Yokohama, Japan

[21] Appl. No.: 369,237

[22] Filed: Jun. 22, 1989

[30] Foreign Application Priority Data

Jun. 22, 1988 [JP] Japan .................. 63-154306

[51] Int. Cl.⁵ .................. B60T 8/32; B60K 17/34
[52] U.S. Cl. .................. 364/426.02; 180/197; 180/233; 364/424.1
[58] Field of Search .................. 364/426.01, 426.02, 364/426.03, 424.01; 180/197, 233; 303/95-97, 103

[56] References Cited

U.S. PATENT DOCUMENTS

| | | | |
|---|---|---|---|
| 4,384,330 | 5/1983 | Matsuda et al. | 303/97 |
| 4,392,202 | 7/1983 | Matsuda | 303/93 |
| 4,408,290 | 10/1983 | Kubo et al. | 364/566 |
| 4,430,714 | 2/1984 | Matsuda et al. | 303/95 |
| 4,569,560 | 2/1986 | Kubo | 303/92 |
| 4,597,052 | 6/1986 | Matsuda | 364/550 |
| 4,637,663 | 1/1987 | Matsuda | 303/97 |
| 4,656,588 | 4/1987 | Kubo | 303/95 |
| 4,660,146 | 4/1987 | Kubo | 303/105 |
| 4,662,686 | 5/1987 | Matsuda | 303/106 |
| 4,663,715 | 5/1987 | Kubo | 303/105 |
| 4,663,716 | 5/1987 | Kubo | 303/95 |
| 4,665,491 | 5/1987 | Kubo | 303/95 |
| 4,667,176 | 5/1987 | Matsuda | 340/693 |
| 4,669,045 | 5/1987 | Kubo | 364/426.02 |
| 4,669,046 | 5/1987 | Kubo | 303/95 |
| 4,674,049 | 6/1987 | Kubo | 303/95 |
| 4,674,050 | 6/1987 | Kubo | 303/97 |
| 4,679,146 | 7/1987 | Kubo | 364/426.02 |
| 4,680,713 | 7/1987 | Kubo | 364/426.02 |
| 4,680,714 | 7/1987 | Kubo | 303/95 |
| 4,682,295 | 7/1987 | Kubo | 303/95 |
| 4,683,537 | 7/1987 | Matsuda | 303/106 |
| 4,699,236 | 10/1987 | Morisawa et al. | 364/424.1 |
| 4,702,341 | 10/1987 | Taga et al. | 364/424.1 |
| 4,704,684 | 11/1987 | Kubo | 303/106 |
| 4,715,466 | 12/1987 | Ishii et al. | 364/424.1 |
| 4,718,013 | 1/1988 | Kubo | 303/95 |
| 4,757,870 | 7/1988 | Torii et al. | 180/197 |
| 4,763,912 | 8/1988 | Matsuda | 180/197 |
| 4,770,266 | 9/1988 | Yamaguchi et al. | 180/197 |
| 4,771,850 | 9/1988 | Matsuda | 180/197 |
| 4,776,424 | 10/1988 | Naito | 180/197 |
| 4,780,818 | 10/1988 | Kubo | 364/426.02 |
| 4,805,103 | 2/1989 | Matsuda | 303/95 |
| 4,809,182 | 2/1989 | Matsuda | 364/426.02 |
| 4,866,624 | 9/1989 | Nishikawa et al. | 364/426.03 |

FOREIGN PATENT DOCUMENTS 0206476 12/1986 European Pat. Off. .
0207395 1/1987 European Pat. Off. .
0217087 4/1987 European Pat. Off. .
3527959A1 1/1987 Fed. Rep. of Germany .

Primary Examiner—Gary Chin
Attorney, Agent, or Firm—Foley & Lardner

[57] ABSTRACT

A control system is associated with both of an anti-skid brake system and a power distribution control system. The control system controls operation of the anti-skid brake system for adjusting the braking pressure in order to maintain a wheel slippage at about optimal level. The control system also adjusts an engaging force for a transfer clutch depending upon projected vehicle body speed representative value.

9 Claims, 9 Drawing Sheets

5,070,460

ANTI-SKID BRAKE CONTROL SYSTEM FOR AUTOMOTIVE VEHICLE SELECTIVE OF TWO WHEEL DRIVE MODE AND FOUR WHEEL DRIVE MODE AND TECHNOLOGY OF CORRELATION OF BRAKE CONTROL AND POWER TRAIN CONTROL FOR OPTIMAL BRAKING EFFICIENCY AND ENHANCED STABILITY

BACKGROUND OF THE INVENTION

1. Field of the Invention

The present invention relates generally to a control system for an automotive vehicle which has the capability of anti-skid control of a brake system and power distribution control for a power train which is selectively operable for adjusting driving torque distribution between front wheels and rear wheels. More specifically, the invention relates to technology for combining or correlating anti-skid control and power train control for obtaining optimal vehicle braking efficiency and enhanced stability.

2. Description of the Background Art

Japanese Patent First (unexamined) Publications (Tokkai) Showa 61-169361 and 61-295132 disclose anti-skid brake control systems for four-wheel drive type vehicles which have clutch mechanisms selectively switching the operation mode of a power train between a four-wheel drive mode and a two (front)-wheel drive mode depending upon the vehicle driving conditions. In such prior proposed systems, the anti-skid brake control system is so associated with a power train control system which switches the operation mode of the power train between the four-wheel drive mode and two-wheel drive mode, as to switch the operation mode from a four-wheel drive mode to a two-wheel drive mode for assured projection of vehicle body speed data based on wheel rotation speed of a wheel which is disconnected from the power source, i.e. an automotive engine, during an active state of the anti-skid brake control system.

As will be seen, the prior proposed system forcibly switches the power train operation mode from four-wheel drive mode to two-wheel drive mode irrespective of wheel slippage magnitude at a primary driving wheel which is constantly connected to the engine. In such a layout, the wheel disconnected from the engine is free from the deceleration torque of the engine during the active state of the anti-skid control. Namely, an engine braking torque is only active on the primary driving wheels. This implies that, because power distribution in the power train is 100 (%): 0 (%) between the primary driving wheels and auxiliary driving wheels which are disconnected from the engine during the active state of the anti-skid brake control, all of the negative driving torque is distributed to the driving wheels. This negative driving torque, i.e. engine braking torque, tends to cause delay in recovery of wheel rotation speed after occurrence of excessive wheel slippage. This tendency becomes substantially higher for a low friction road, such as a icy road, snow road and so forth. Delay of recovery of wheel rotation speed maintains the wheel slippage at an excessive level for a relatively long time so as to cause degradation of the vehicle drivability. In the case where the primary driving wheels are the rear wheels, vehicle driving stability can be degraded. On the other hand, in the case where the primary driving wheels are the front wheels, vehicle steering stability can also be degraded.

On the other hand, another approach has been proposed in SUBARU ALCYONE New Car Explanation, pages 108 and 161, published by Fuji Jukogyo Kabushiki Kaisha, on July, 1987. In this proposed technology, an engaging force of the transfer clutch is adjusted at a predetermined value during the active state of the anti-skid brake control system. Although this technology may slightly improve the vehicle driving stability, it still encounters a problem of vehicular driving instability particularly on a low friction road. Namely, even with the controlled engaging force, the deceleration caused by engine braking effect at relatively high vehicle speed on a low friction road may encounter the problem as in the former publications.

SUMMARY OF THE INVENTION

Therefore, it is an object of the present invention to provide a control system for an anti-skid brake system and a power distribution control system for providing optimum braking efficiency without degrading vehicular driving and/or steering stability.

In order to accomplish aforementioned and other objects, a control system, according to the present invention, is associated with both of an anti-skid brake system and a power distribution control system. The control system controls operation of the anti-skid brake system for adjusting the braking pressure in order to maintain a wheel slippage at about optimal level. The control system also adjusts an engaging force for a transfer clutch depending upon a projected vehicle body speed representative value.

According to one aspect of the invention, a combination comprises:

a power train control system associated with an automotive internal combustion engine for distributing driving torque generated by the engine to primary and secondary wheels, the power train control system being operative for adjusting power distribution between the primary and secondary driving wheels in such a manner that full power is distributed to the primary driving wheels in a two wheel drive mode and even power is distributed in a complete four wheel drive mode, the power distribution being varied between the two wheel drive mode and the complete four wheel drive mode;

an anti-skid brake control system for controlling a braking pressure for maintaining a wheel slippage in the vicinity of a predetermined optimum level, the anti-skid control system comprising:

a braking circuit connecting a pressurized fluid source to a wheel cylinder for each of the front and rear wheels for building up braking pressure in the latter;

a pressure control valve, disposed in the braking circuit, for controlling braking pressure in the wheel cylinder, the pressure control valve means operable for increasing braking pressure in the wheel cylinder in a first mode and decreasing braking pressure in the wheel cylinder in a second mode;

first sensor for monitoring rotation speed of associated one of the front and rear wheels for producing a wheel speed indicative signal;

a second unit for deriving a wheel slippage on the basis of the wheel speed indicative signal and producing a wheel slippage data;

third unit for producing a first control signal for controlling an operation mode of the pressure control valve means for switching the operation mode between the first and second mode in order to maintain wheel slippage in the vicinity of the predetermined optimum value, on the basis of the wheel slippage data; and a fourth unit for controlling the power train control system for adjusting power distribution depending upon a preselected vehicle driving parameter including vehicle body speed representative data derived from the wheel speed indicative signal, the fourth means being active for selecting greater power distribution for the secondary wheels at greater vehicle body representative data.

The combination may further comprise a fifth unit for detecting a gear position of a power transmission for producing a gear position indicative signal, and the fourth unit adjusts the power distribution depending upon the gear position of the power transmission. The fourth unit selects smaller power distribution for the secondary wheels at a low speed gear position of the power transmission than that at a high speed gear position. The power train control system may vary power distribution between the two wheel drive mode and the complete four wheel drive mode in a linear fashion. The power train control system may comprise a clutch associated with a pressure unit adjusting an engaging pressure of the clutch in order to achieve power distribution selected by the fourth unit. The fourth unit may produce a power train control signal having a value representative of selected power distribution, and the pressure unit may include unit for linearly adjusting engaging pressure of the clutch.

Preferably, the anti-skid brake control system controls the pressure control valve unit for respective primary and secondary wheels independently of each other.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
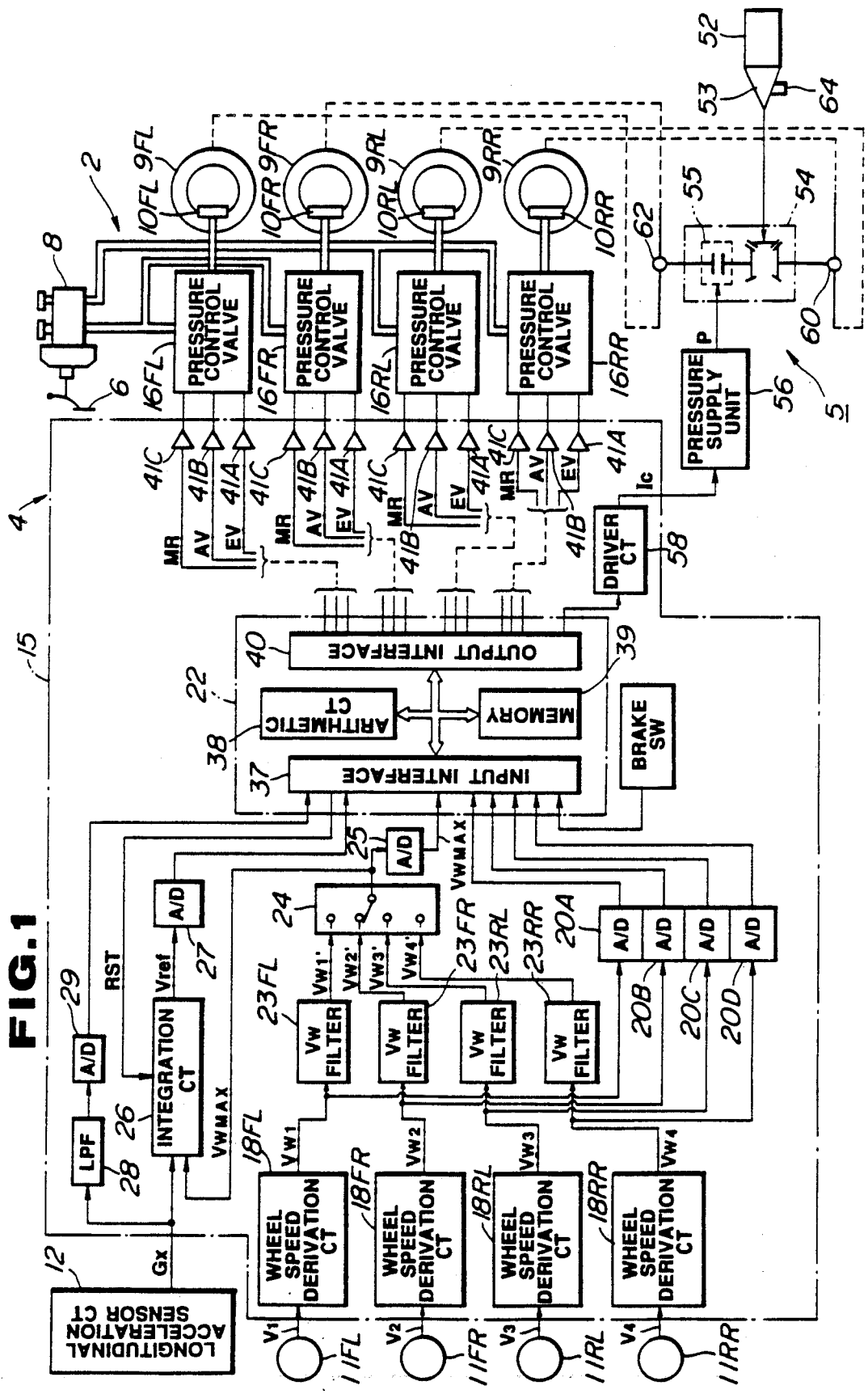
FIG. 1 is a block diagram of the preferred embodiment of an anti-skid brake control system, according to the present invention, which is associated with a power distribution control unit in a four-wheel drive power train.

Referring now to the drawings, particularly to FIG. 1, the preferred embodiment of an anti-skid brake control system, according to the present invention, is applied to an automotive vehicle having a power train for distributing driving torque of an automotive internal combustion engine selectively to front auxiliary driving wheels 9FL and 9FR and rear primary driving wheels 9RL and 9RR in a four-wheel drive mode, and only to the rear primary wheels in a two-wheel drive mode. The power train comprises a part-time four-wheel drive power train which can selectively switch between the two-wheel mode and the four-wheel drive mode depending upon the vehicle driving conditions.

For respective front-left, front-right, rear-left and rear-right wheels 9FL, 9FR, 9RL and 9RR, hydraulic brake units having wheel cylinders 10FL, 10FR, 10RL and 10RR are provided. The wheel cylinders 10FL, 10FR, 10RL and 10RR form part of anti-skid brake control system 4 and are designed to generate a controlled magnitude of braking force for decelerating respectively associated wheels 9FL, 9FR, 9RL and 9RR. As set forth above, the anti-skid brake control system 4 is associated with a power train control system 5 for controlling distribution of the engine driving torque to the front and rear wheels 9FL, 9FR, 9RL and 9RR.

As is well known, the vehicle is provided with a vehicular hydraulic brake system 2 which includes a brake pedal 6 which is mechanically connected to a master cylinder 8. The master cylinder 8 has two independent ports respectively connected to wheel cylinders 10FL, 10FR, 10RL and 10RR of front and rear wheels 9FL, 9FR, 9RL and 9RR via respectively independent hydraulic circuits. Pressure control valves 16FL, 16FR, 16RL and 16RR are provided in the hydraulic circuits for controlling the supply of hydraulic working fluid for respective wheel cylinders 10FL, 10FR, 10RL and 10RR for adjusting braking pressure to be generated in respective wheel cylinders.

The pressure control valves 16FL, 16FR, 16RL and 16RR are connected to an anti-skid brake control unit 15. The anti-skid brake control unit 15 is connected to wheel speed sensors 11FL, 11FR, 11RL and 11RR respectively associated with front-left, front-right, rear-left and rear-right wheels 9FL, 9FR, 9RL and 9RR for monitoring the rotation speed of respectively associated wheels. In general, each of the wheel speed sensors 11FL, 11FR, 11RL and 11RR comprises a rotor for rotating with the associated one of the wheels 9FL, 9FR, 9RL and 9RR, a plurality of notchings formed on the outer circumference of the rotor, and a magnetoelectric or optoelectric proximity sensor for detecting respective notchings for generating an alternating current frequency signal. Such a frequency signal has a frequency proportional to the rotation speed of the associated wheel. The frequency signals generated by the wheel speed sensors 11FL, 11FR, 11RL and 11RR will be hereafter referred to as "wheel speed indicative signals $v_1$, $v_2$, $v_3$ and $v_4$". The anti-skid brake control unit 15 is also connected to a longitudinal acceleration sensor circuit 12 which monitors longitudinal acceleration exerted on the vehicle body and produces a longitudinal acceleration indicative signal Gx. The longitudinal acceleration indicative signal Gx produced by the longitudinal acceleration sensor circuit 12 is an analog signal having a signal level variable depending upon the longitudinal acceleration exerted on the vehicle body. The value of the longitudinal acceleration indicative signal Gx is positive when the longitudinal acceleration exerted on the vehicle body is negative, i.e. decelerating, and is negative when the longitudinal acceleration exerted on the vehicle body is positive, i.e. accelerating.

The anti-skid brake control unit 15 has wheel speed derivation circuits 18FL, 18FR, 18RL and 18RR respectively connected to the wheel speed sensors 11FL, 11FR, 11RL and 11RR to receive the wheel speed indicative signals $v_1$, $v_2$, $v_3$ and $v_4$. Respective wheel speed derivation circuits 18FL, 18FR, 18RL and 18RR perform frequency-to-voltage (F/V) conversion to generate wheel speed indicative voltage signals $Vw_1$, $Vw_2$, $Vw_3$ and $Vw_4$. The wheel speed indicative voltage signals $Vw_1$, $Vw_2$, $Vw_3$ and $Vw_4$ of the wheel speed derivation circuits 18FL, 18FR, 18RL and 18RR are fed to a microprocessor-based controller 22 via analog-to-digital (A/D) converters 20A, 20B, 20C and 20D. At the same time, the wheel speed indicative voltage signals $Vw_1$, $Vw_2$, $Vw_3$ and $Vw_4$ are fed to secondary lag factor digital filter circuits 23FL, 23FR, 23RL and 23RR. Respective filter circuits 23FL, 23FR, 23RL and 23RR are provided with an A/D converter at the input side and an digital-to-analog (D/A) converter at the output side. The filter circuits 23FL, 23FR, 23RL and 23RR limit the wheel deceleration gradient with decreasing wheel speed, at a predetermined wheel deceleration gradient limit $-k_1$ and the wheel acceleration gradient with increasing wheel speed at a predetermined wheel acceleration gradient limit $k_2$. The filter circuits 23FL, 23FR, 23RL and 23RR output analog form limited wheel speed indicative signals $Vw_1'$, $Vw_2'$, $Vw_3'$ and $Vw_4'$ to a select-HIGH switch 24. The select-HIGH switch 24 selects the greatest one of the input signals $Vw_1'$, $Vw_2'$, $Vw_3'$ and $Vw_4'$ to output select-HIGH output $Vw_{max}$. The select-HIGH output $Vw_{max}$ is fed to the controller 22. Simultaneously, the select-HIGH output $Vw_{max}$ is fed to an integrator circuit 26 as an initial value for the integrator circuit 26. The integrator circuit 26 latches the select-HIGH output $Vw_{max}$ from the select-HIGH switch 24 in response to a reset signal RST output from the controller 22 and, at the same time clears an integrated value of the longitudinal acceleration indicative signal and restarts integration of the longitudinal acceleration indicative signal $G_x$. The integrator circuit 26 adds the intergrated value to the latched initial value, i.e. the instantaneous select-HIGH output $Vw_{max}$ upon occurrence of the reset signal RST for outputting a signal having a sum value. The sum value indicative signal output from the integrator circuit 26 serves as a vehicle body speed representative signal $V_{ref}$. The vehicle body speed representative signal $V_{ref}$ is input to the controller 22 via an A/D converter 27. Furthermore, the longitudinal acceleration indicative signal Gx of the longitudinal acceleration sensor 12 is also input to the controller 22 via a low-pass filter 28 for removing a high frequency noise component and to an A/D converter 29.

The controller 22 comprises an input interface 37, an arithmetic circuit 38 which generally comprises a CPU, a memory unit 39 which generally includes a RAM and a ROM, and an output interface 40. The output interface 40 of the controller 22 is connected to amplifiers 41A, 41B and 41C of respective channels, each of which is associated with one of the pressure control valve units 16FL, 16FR, 16RL and 16RR for controlling the valve positions. The amplifier 41A is adapted to amplify an inlet (EV) control signal for controlling introduction of the pressurized working fluid into the associated one of the wheel cylinders 10FL, 10FR, 10RL and 10RR, and thus will be hereafter referred to as the "EV amplifier". The amplifier 41B adapted to amplify an outlet (AV) control signal for controlling draining of the pressurized fluid from the associated one of the wheel cylinders 10FL, 10FR, 10RL and 10RR, which amplifier will be hereafter referred to as the "AV amplifier". Also, the amplifier 41C is designed to amplify a pump control signal MR for controlling operation of a fluid pump in the pressure control valve units 16FL, 16FR, 16RL and 16RR, and will be hereafter referred to as the "MR amplifier".

The output interface 40 of the controller 22 is also connected to a driver circuit 58 which is, in turn, connected to a pressure supply unit 56 which is hydraulically associated with a hydraulically controlled clutch 55 in a transfer unit 54 which controls power distribution for front and rear differential gear units 60 and 62. The driver circuit 58 outputs a driver signal for controlling the pressure supply unit 56 for generating hydraulic pressure proportional to a power train control signal Ic commanding one of the four-wheel drive mode and the two-wheel drive mode. In the embodiment shown, the power train control signal Ic varies between HIGH level for commanding four-wheel drive mode and LOW level for commanding two-wheel drive mode. Therefore, the hydraulic pressure to be supplied to the hydraulic clutch 55 from the pressure supply unit 56 varies between HIGH level and LOW level. When the HIGH level hydraulic pressure is supplied, the hydraulic clutch 55 is engaged to distribute the engine output torque to both of the front and rear differential gear units 60 and 62. On the other hand, when the LOW level hydraulic pressure is supplied, the hydraulic clutch 55 is disengaged to disconnect the front differential gear unit 60.

In addition, the embodiment of the control system includes a transmission gear position sensor 64 associated with a power transmission 52 associated with an automotive engine. The power transmission 52 has an output shaft connected to the power transfer unit 54 for inputting the output driving torque. On the other hand, the transmission gear position sensor 64 is designed for detecting the gear position of the power transmission to produce a transmission gear position indicative signal representative of the selected gear position of the power transmission.

Figure 2:
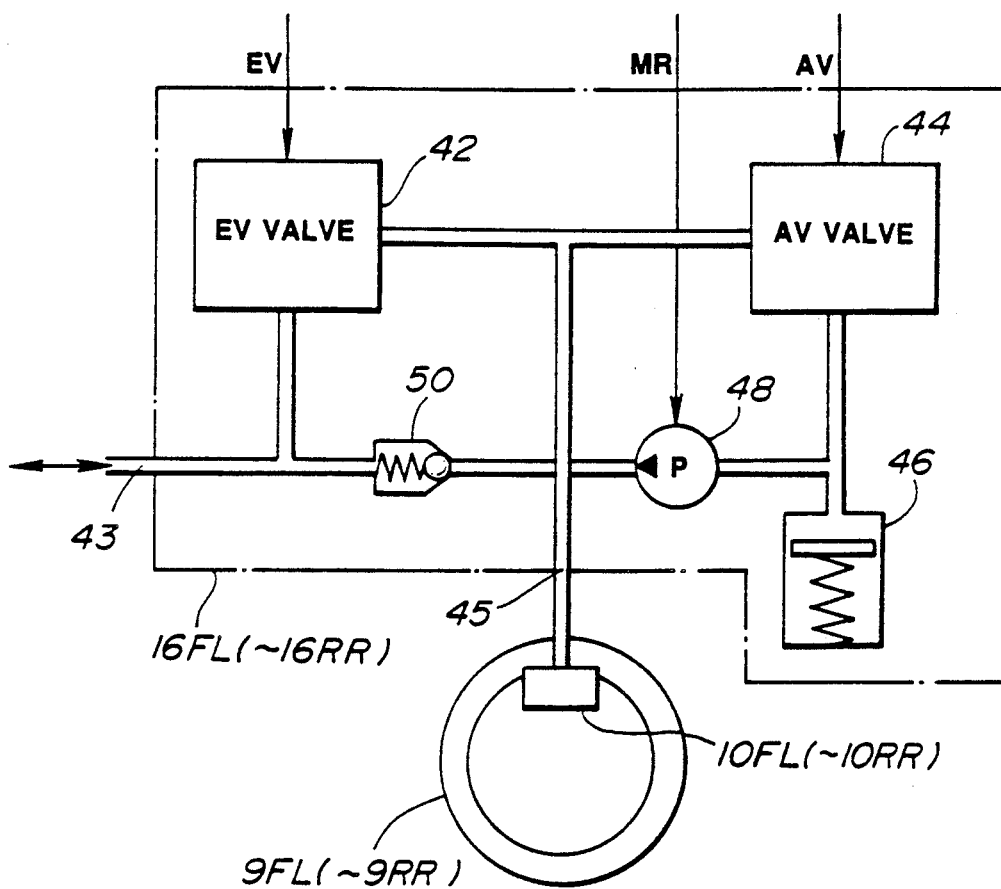
FIG. 2 is a block diagram showing detailed construction of a pressure control valve unit disposed in a vehicular brake circuit employed in the preferred embodiment of the anti-skid brake control system according to the invention.

As shown in FIG. 2, the pressure control valve unit 16 which reference numeral commonly represents the pressure control valve units 16FL, 16FR, 16RL and 16RR, comprises an induction control valve 42 which will be hereafter referred to as the "EV valve", a drain control valve 44, which will be hereafter referred to as the "AV valve" and a drain pump 48 and a pressure accumulator 46. The pressure control valve 16 has an inlet port 43 connected to the master cylinder 8 to receive the working fluid pressure built up in the latter and an outlet port 45 connected the wheel cylinder 10 which reference numeral generally represents the wheel cylinders 10FL, 10FR, 10RL and 10RR. The EV valve 42 is interposed between the inlet port 43 and the outlet port 45 for controlling introduction of the pressurized working fluid to the wheel cylinder 10. The AV valve 44 is connected to the outlet of the EV valve 42, the outlet port 45 at the inlet side and to the pressure accumulator 46 and the drain pump 48. The discharge outlet drain pump 48 is connected to the inlet port 43 via a one-way check valve 50 for returning part of working fluid in the pressure control valve unit 16 to the fluid reservoir (not shown) and designed for supplying pressurized working fluid.

With the construction set forth above, the pressure control valve unit 22 essentially operates in three mutually different operational modes. Name, the pressure control valve unit 22 operates in an APPLICATION mode for increasing braking pressure in the wheel cylinder 10, a RELEASE mode for decreasing braking pressure in the wheel cylinder, and a HOLD mode to maintain the braking pressure constant. In the APPLICATION mode position, the EV valve 42 is maintained in an open position to establish fluid communication between the master cylinder 8 and the wheel cylinder 10 and the AV valve 44 is maintained in a closed position for blocking fluid communication between the wheel cylinder 10 and the pressure accumulator 46. At the same time, the drain pump 48 may be held in a inoperative state.

In the RELEASE mode position of the pressure control valve unit 16, the EV valve 42 is held closed to block fluid communication between the inlet port and the outlet port, thereby blocking pressure supply from the master cylinder 8 to the wheel cylinder 10. At the same time, the AV valve 44 is maintained at an open position to establish fluid communication between the outlet port 45, the pressure accumulator 46 and the drain pump 48 so that the pressurized fluid in the wheel cylinder 10 can be drained to the pressure accumulator 46 or to the fluid reservoir via the drain pump 48 and the one-way check valve 50. In order to drain part of the working fluid from the wheel cylinder to the fluid reservoir, the drain pump 48 is driven in this RELEASE mode. On the other hand, in the HOLD mode position, both the EV valve 42 and the AV valve 44 are held closed for completely disconnecting the wheel cylinder 10 from the inlet port 43 and the pressure accumulator 46.

The EV valve 42 is held in an open position in response to the LOW level EV signal and shifted to a closed position in response to the HIGH level EV signal. On the other hand, the AV valve 44 is maintained at a closed position as long as the AV signal is held at the LOW level and is opened by the HIGH level AV signal. The drain pump 48 is driven by the HIGH level MR signal.

The pressure control valve unit 16 is operated in the aforementioned three mode positions over the skid control cycle. In general, a skid control cycle is scheduled as follows:

(1) the pressure control valve unit 16 is maintained at the APPLICATION mode position upon initiation of the braking operation which is triggered by depression of the brake pedal 6, (2) by application of the braking force to the brake pedal, working fluid pressure is built up in the master cylinder 8, since the pressure control valve unit 16 is held at the APPLICATION mode position, the braking pressure in the wheel cylinder 10 is increased linearly in proportion to increasing of the working fluid pressure to decelerate the wheel speed;

(3) by increasing of the braking pressure, wheel deceleration $-\alpha$ (negative value of wheel acceleration) increases and becomes greater than a predetermined deceleration threshold $-\alpha_{ref}$, the control unit 22 is responsive to the wheel deceleration increased across the deceleration threshold to initiate the skid control cycle, upon which the skid control cycle enters into a HOLD mode cycle period to place the pressure control valve unit 16 at the HOLD mode position to maintain the increased level of braking pressure constant;

(4) by holding the increase level of braking pressure in the HOLD mode position of the pressure control valve unit 16, the wheel is decelerated to increase wheel slippage across a predetermined wheel slippage threshold, the control unit 22 is responsive to of the wheel slippage increasing across the wheel slippage threshold to terminate the HOLD mode cycle period and trigger the RELEASE mode cycle period, in which the pressure control valve unit 16 is placed in the RELEASE mode position to decrease braking pressure in the wheel cylinder 10;

(5) by maintaining the pressure control valve unit 16 in the RELEASE mode position, braking pressure is reduced and thus the wheel is accelerated to result in increasing of wheel acceleration $+\alpha$ across a predetermined wheel acceleration threshold $+\alpha_{ref}$, the control unit 22 is responsive to increasing of the wheel acceleration $+\alpha$ across the wheel acceleration threshold $+\alpha_{ref}$ to terminate the RELEASE mode cycle period and trigger a HOLD mode cycle period to switch the position of the pressure control valve unit 16 from the RELEASE mode position to the HOLD mode position in order to hold the braking pressure at the lowered level;

(6) by maintaining the pressure control valve unit 16 at the HOLD mode, wheel speed is resumed and increased across the vehicle body speed and subsequently returns to the speed corresponding to the vehicle body speed, the control unit 22 is responsive to the wheel speed once increased across the vehicle body speed and subsequently returned to the vehicle body speed to terminate the HOLD mode cycle period and trigger the APPLICATION mode cycle period;

skid cycles (3) to (6) are repeated while anti-skid control is active.

The following is a discussion of the practical process of anti-skid brake control operation performed by the preferred embodiment of the anti-skid brake control system set forth above.

This embodiment of the anti-skid brake control system is triggered in response to turning ON of the ignition switch to initiate the power supply. Then, wheel speed sensors 12FL, 12FR, 12RL, 12RR start monitoring of rotation speed of respectively corresponding wheels 9FL, 9FR, 9RL and 9RR. The wheel speed sensors 12FL, 12FR, 12RL and 12RR thus continuously produce the wheel speed indicative signals $v_1$, $v_2$, $v_3$ and $v_4$. The alternating current form wheel speed indicative signals $v_1$, $v_2$, $v_3$ and $v_4$ are cyclically or periodically converted into digital wheel speed indicative data $Vw_1$, $Vw_2$, $Vw_3$ and $Vw_4$ to be input to the microprocessor 22. Simultaneously, the wheel speed indicative voltage signals $Vw_1$, $Vw_2$, $Vw_3$ and $Vw_4$ are fed to the wheel speed filters 23FL, 23FR, 23RL, 23RR. The wheel speed filters 23FL, 23FR, 23RL, 23RR derive wheel speed variation data with a predetermined period, e.g. 5 msec, to compare with an acceleration limit value $k_2$, e.g. 0.8 km/h and a deceleration limit value $-k_1$, e.g. $-1$ km/h. When the wheel speed variation data is smaller than the deceleration limit value $-k_1$ or greater than the acceleration limit value $k_2$, the instantaneous wheel speed indicative voltage signal level is modified to maintain the variation within the given range defined by the acceleration limit value $k_2$ and the deceleration limit value $-k_1$. The wheel speed filters 23FL, 23FR, 23RL, 23RR thus produce the limited wheel speed indicative signals $Vw_1'$, $Vw_2'$, $Vw_3'$ and $Vw_4'$. On the other hand, when the difference is maintained within the given range, the wheel speed indicative voltage signals $Vw_1$, $Vw_2$, $Vw_3$ and $Vw_4$ are output as the limited wheel speed indicative signals $Vw_1'$, $Vw_2'$, $Vw_3'$ and $Vw_4'$. The select-HIGH switch 25 selects the greatest wheel speed indicative signal among the four limited wheel speed indicative signals $Vw_1'$, $Vw_2'$, $Vw_3'$ and $Vw_4'$ as the maximum wheel speed indicative data $Vw_{max}$.

On the other hand, the longitudinal acceleration indicative signal $Gx$ of the longitudinal acceleration sensor circuit 12 can be converted into an absolute value signal $|Gx|$ in an absolute value circuit and summed with an offset value A of an offset value generator circuit at a summing junction, all within circuit 12. The longitudinal acceleration indicative signal containing the offset value is thus input to the integrator circuit 26. The integrator circuit 26 is periodically or cyclically reset by the HIGH level reset signal. Therefore, as long as the reset signal RST is held at a HIGH level, the initial vehicle body speed representative value $V_{ref}$ is cyclically or periodically reset to update the stored initial value with the maximum wheel speed indicative value $Vw_{max}$.

Figure 3:
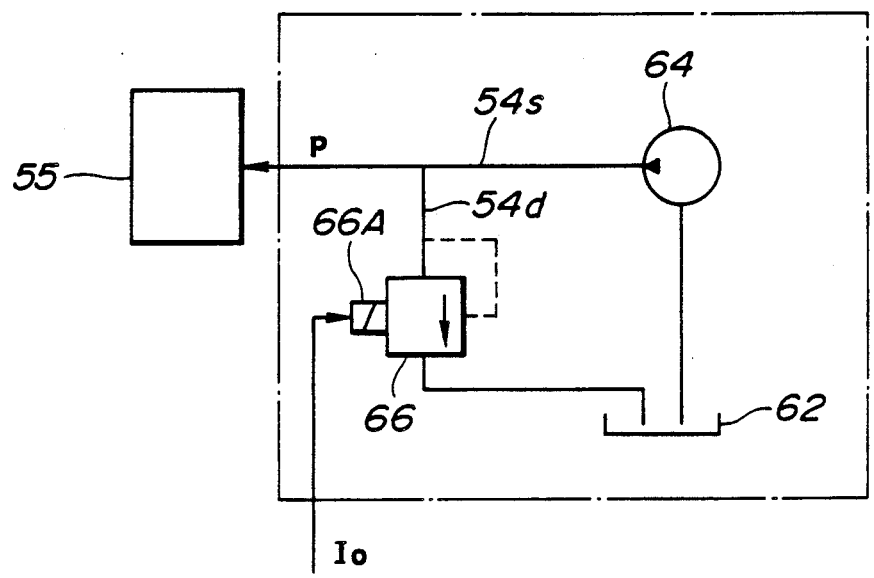
FIG. 3 is a schematic circuit diagram showing hydraulic circuit for controlling engaging pressure of a transfer clutch employed in the power distribution control unit.

As set forth, the hydraulic clutch 55 of the transfer unit 54 is associated with the pressure supply unit 56. As shown in FIG. 3, the pressure supply unit 56 comprises a fluid pump 64 connected to a fluid reservoir 62 to suction the working fluid and circulate the pressurized fluid through the hydraulic clutch 54. A proportioning valve 66 is provided in a return line 54$d$ of a hydraulic circuit establishing a connection between a supply line 54$s$ and the fluid reservoir 62. Therefore, the proportioning valve 66 serves as a pressure relief valve for relieving fluid pressure higher than a set pressure thereof. The set pressure is variable depending upon a control current as the power train control signal Ic from the control unit 22 supplied to a proportioning solenoid 66A of the proportioning valve 66.

Figure 4:
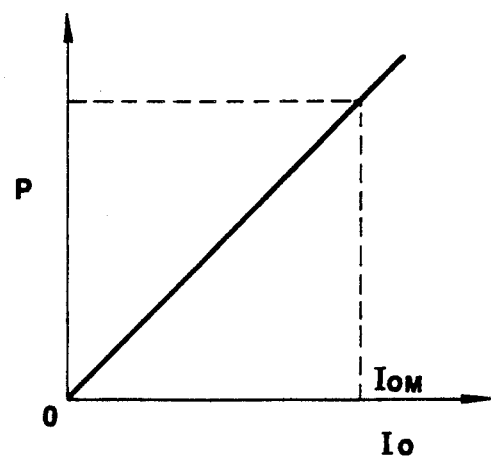
FIG. 4 shows a relationship between a power distribution control signal level and the engaging pressure to be generated in response to the power distribution control signal.

As can be seen from FIG. 4, the set pressure P of the proportioning valve 66 is linearly variable in proportion to the control current Ic supplied to the proportioning solenoid 66A. In this embodiment, when the control current level is zero, the set pressure P becomes zero to drain all the working fluid to the fluid reservoir 62. Therefore, no engaging pressure may be supplied to the hydraulic clutch 55. As a result, the hydraulic clutch 55 is held disengaged. At this clutch position, the transfer unit 54 operates in a complete two wheel drive mode for driving only the primary driving wheels. According to increasing of the control current Ic, the set pressure P increases in a linearly proportional fashion to the control current. According to increasing of the set pressure, the engaging pressure to be exerted on the hydraulic clutch 55 is increased for causing slipping engagement for distributing driving torque to the primary driving wheels and auxiliary driving wheels. When the control current reaches a predetermined level $I_{OM}$, the engaging pressure to be exerted on the hydraulic clutch 55 becomes enough to establish full engagement of the clutch. As a result, power distribution between the primary driving wheels and the auxiliary driving wheels becomes even to each. Therefore, at this position, the transfer unit 54 operates in a complete four wheel drive mode. In the disclosure given hereinafter, the power distribution mode between the complete two wheel drive mode and complete four wheel drive mode will be referred to as "controlled power distribution mode". Also, the ratio of power distribution in the controlled power distribution mode will be hereafter referred to as "controlled power distribution ratio".

The routines shown in FIGS. 5 to 8 are triggered every predetermined timing, e.g. every 20 msec while the vehicular braking state is maintained. It should be noted that the routines shown in FIGS. 5 to 8 are executed with respect to each wheel independently of each other. The routines for respective wheels may be executed every four cycles of the execution cycles. In the alternative, respective execution cycles of the routines for respective wheels may be performed at different phases so as to enable independent brake control at an equal interval, e.g. 20 msec.

Figure 5:
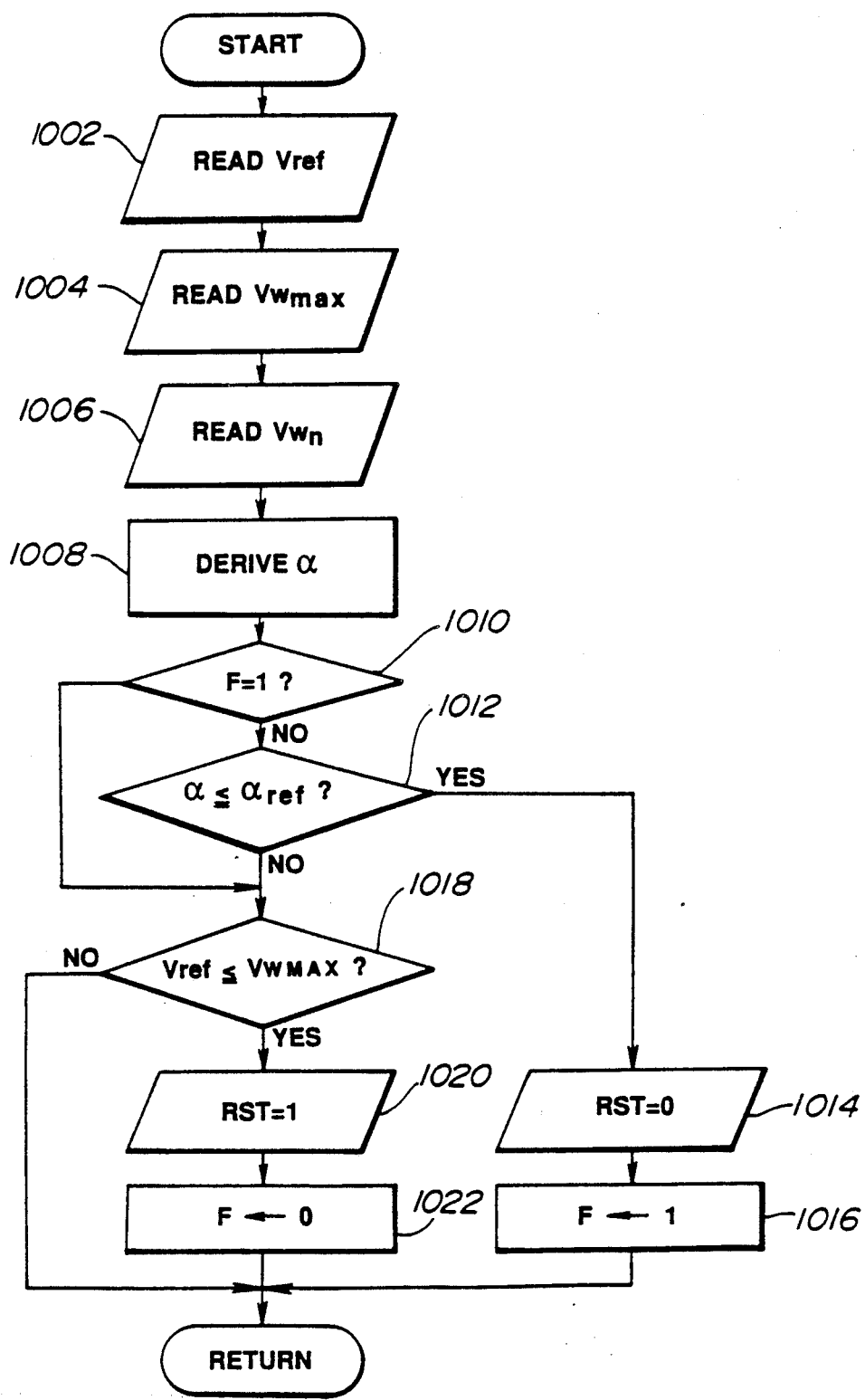
FIG. 5 is a flowchart showing an interrupt routine for setting and resetting a skid cycle indicative flag.

In the process illustrated in FIG. 5, at a step 1002 performed immediately after starting execution, the vehicle body speed representative data $V_{ref}$ is read out and temporarily stored in a temporary register in the memory unit 34. Then, the maximum wheel speed indicative data $Vw_{max}$ is read out at a step 1004 and temporarily stored in the temporary register. Similarly, at a step 1006, the wheel speed indicative data $Vw_n$ ($n = 1, 2, 3, 4$) is read out is stored in the temporary register.

At a step 1008, a wheel acceleration $\alpha$ is calculated on the basis of the instantaneous wheel speed indicative data with preceding read wheel speed data. It is, of course, possible to derive the wheel acceleration on the basis of the wheel speed difference between the instantaneous wheel speed indicative data value and the wheel speed indicative data value read at an immediately preceding execution cycle, and a known execution interval. However, it is also possible to derive the wheel acceleration in a more precise manner as disclosed in the following United States Patents Nos.

U.S. Pat. No. 4,392,202, issued on July 5, 1983
U.S. Pat. No. 4,384,330, issued on May 23, 1984

Furthermore, it is also possible to derive the wheel acceleration by differentiating the wheel speed indicative data as disclosed in the United States Patent listed herebelow.

U.S. Pat. No. 4,430,714, issued on Feb. 7, 1984

All of the above-identified United States Patents are owned by the common assignee of the present invention. The disclosures of these United States Patents are herein incorporated by reference for the sake of completeness.

At a step 1010, a skid cycle indicative flag F1 is checked as to whether it is set or not. The skid cycle indicative flag F1 indicates the state of derivation of vehicle speed representative data $V_{ref}$. Namely, the skid cycle indicative flag F1 is set when the vehicle speed representative data $V_{ref}$ is derived utilizing the integrated value of the longitudinal acceleration indicative data ($|Gx|+A$). When the skid cycle indicative flag F1 is not set as checked at the step 1010, the wheel acceleration $\alpha$ is compared with the deceleration threshold $-\alpha_{ref}$ at a step 1012. If the wheel acceleration is smaller than or equal to the deceleration threshold $-\alpha_{ref}$, or in other words the wheel deceleration is greater than the deceleration threshold, as checked at the step 1012, then the HIGH level reset signal RST is output at a step 1014 to the integrator circuit 26. By the leading edge of the HIGH level reset signal RST, the integrator circuit 26 is enabled to sum the latched maximum wheel speed indicative data $Vw_{max}$ with the integrated value of the longitudinal acceleration indicative data ($|Gx|+A$). Thereafter, the skid cycle indicative flag F1 is set at a step 1016.

On the other hand, when the wheel acceleration $\alpha$ is greater than the deceleration threshold $-\alpha_{ref}$ as checked at the step 1012, the vehicle body speed indicative data $V_{ref}$ is compared with the maximum wheel speed indicative data $Vw_{max}$ at a step 1018. If the vehicle body speed representative data $V_{ref}$ is smaller than or equal to the maximum wheel speed indicative data $Vw_{ref}$ as checked at the step 1018, then the LOW level reset signal RST is output at the step 1020 for resetting the stored value in the integrator circuit 26 and for latching the instantaneous maximum wheel speed indicative data $Vw_{max}$. Thereafter, the skid cycle indicative flag F1 is reset at a step 1022.

On the other hand, when the skid cycle indicative flag F1 is set as checked at the step 1010, then the process jumps the step 1012 and directly goes to the step 1018. Also, when the vehicle body speed representative data $V_{ref}$ is greater than the maximum wheel speed indicative data $Vw_{max}$ as checked at the step 1018, then the process directly goes to END.

Figure 6:
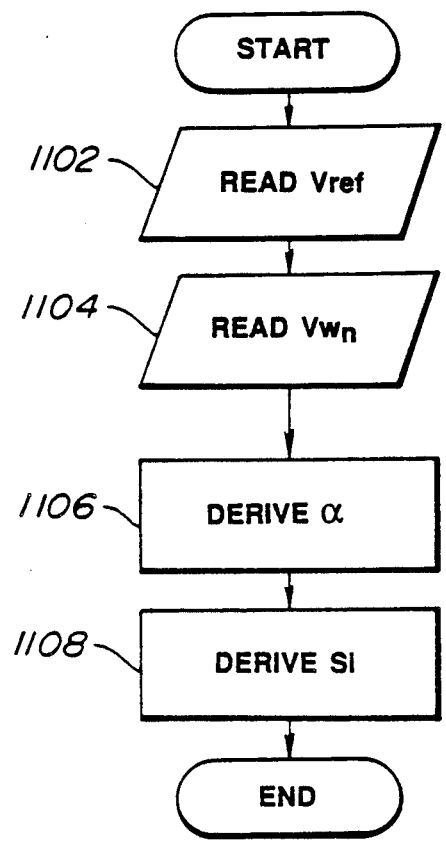
FIG. 6 is a flowchart showing an interrupt routine for deriving wheel acceleration and a wheel slippage.

FIG. 6 illustrates another routine for deriving the wheel acceleration $\alpha$ and the wheel slippage S1. This routine is also executed at a given interval, e.g. 20 msec. In this routine, the vehicle body speed representative data $V_{ref}$ is read out at a step 1102. At a step 1104, the instantaneous wheel speed indicative data $Vw_n$ is read out. The read vehicle body representative data $V_{ref}$ and the instantaneous wheel speed indicative data $Vw_n$ are temporarily stored in the temporary register.

At a step 1106, the wheel acceleration $\alpha$ is derived on the basis of the wheel speed indicative data $Vw_n$. Then, wheel slippage Si is calculated by the following equation:

$$Si = ((V_{ref} - Vw_n)/V_{ref}) \times 100 (\%)$$

at a step 1108. After deriving the wheel slippage Si, the process returns to the background job.

Figure 7:
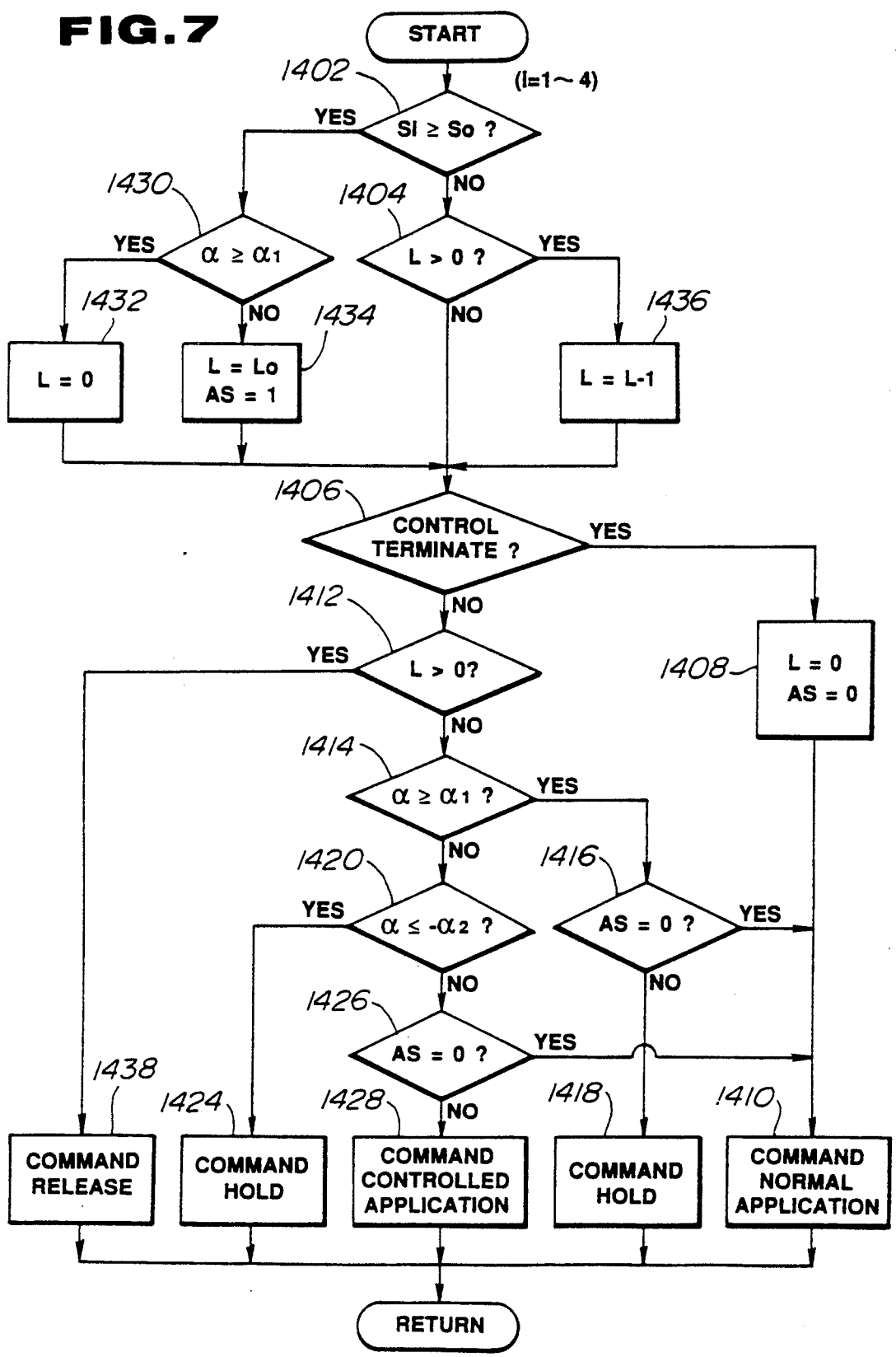
FIG. 7 is a flowchart showing an interrupt routine for controlling a power train operation mode.

FIG. 7 shows a skid cycle control routine for controlling the skid control cycle generally according to the schedule set forth in the general discussion of the process of anti-skid brake control. The skid cycle control routine of FIG. 7 is discussed herebelow with additional reference to FIGS. 9 and 10. It should be noted in the timing chart of FIG. 10, that the lines showing the wheel speed $Vw_n$, the maximum wheel speed $Vw_{max}$, the vehicle body speed $V_{ref}$ are illustrated in a phase shifted manner so as to show respective speed variation clearly.

Figure 9:
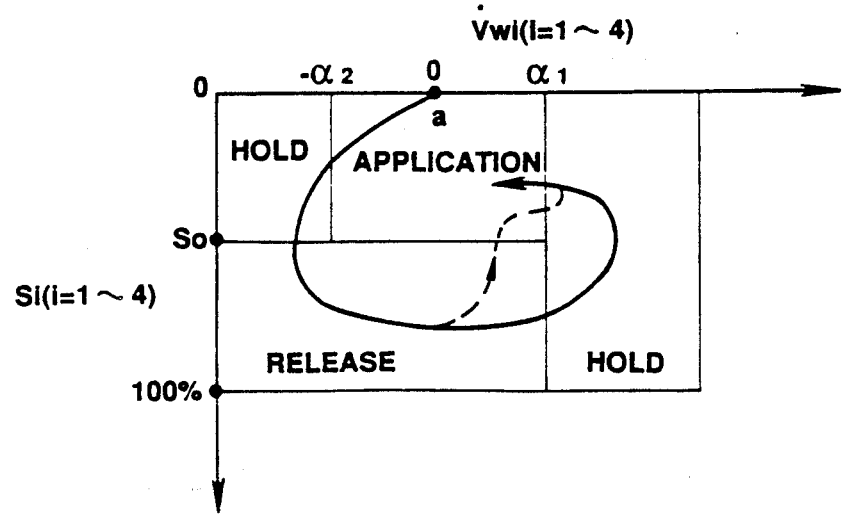
FIG. 9 is an illustration showing a schedule of a skid control cycle for anti-skid brake control.

It is assumed that the vehicle is traveling steadily before braking operation and anti-skid control is not active. Unless the brake is applied, wheel slippage Si is generally maintained at zero. Therefore, in the skid cycle control schedule as shown in FIG. 9, the entering point to enter the vehicle braking state is a. At this condition, the routine of FIG. 7 is triggered to be periodically executed in response to depression of the brake pedal.

Immediately after starting execution, the wheel slippage Si is compared with a predetermined wheel slippage threshold $S_0$ at a step 1402. The wheel slippage threshold $S_0$ may be set at about the optimum wheel slippage range where an optimum vehicle braking efficiency can be obtained. In this embodiment, the wheel slippage threshold $S_0$ is set at 15%.

At the initial stage of the braking operation, wheel slippage Si is held smaller than the wheel slippage threshold $S_0$. Therefore, the answer at the step 1402 at the initial braking state becomes negative. Then, at a step 1404, a check is performed whether a RELEASE mode timer value L of a RELEASE mode timer (not shown but facilitated in the arithmetic circuit 34 of the microprocessor 22) is greater than zero or not. At this time, the RELEASE mode timer value L is maintained at zero, the answer at the step 1404 also becomes negative. Then, at a step 1406, a judgment is made whether the condition satisfies a predetermined skid control terminating condition.

In the practical embodiment, the skid control terminating conditions are set as follows:

when the vehicle body speed indicative data $V_{ref}$ is smaller than or equal to a vehicle body stopping state indicative reference value $V_{ref0}$;

when the number of occurrences of switching of the pressure control valve mode position in the CONTROLLED APPLICATION mode becomes greater than or equal to a predetermined value $N_0$; and when the brake switch is turned OFF.

When the skid control terminating condition is satisfied as checked at the step 1406, the RELEASE mode timer value L is cleared and a skid control state indicative period flag AS is reset at a step 1408. At a step 1410, thereafter the, process goes to END.

If the skid control terminating condition as checked at the step 1406 is not satisfied, the RELEASE mode timer value L is again checked at a step 1412. When the RELEASE mode timer value L is smaller than or equal to zero as checked at the step 1412, the wheel acceleration $\alpha$ is compared with a predetermined acceleration threshold $+\alpha_1$ at a step 1414. If the acceleration as checked at the step 1414 is greater than or equal to the wheel acceleration threshold $+\alpha_1$, it means that the wheel is not yet decelerated after initiation of increasing of the braking pressure or the wheel is accelerated during RELEASE mode cycle period. Therefore, in order to discriminate the instantaneous status of the braking condition, a check is performed whether the skid control state indicative flag AS is set at a step 1416. When the skid control state indicative flag AS is not set as checked at a step 1416, then the process goes to the step 1410 for setting the operation mode to the NORMAL APPLICATION mode.

On the other hand, when the skid control state indicative flag AS is set as checked at the step 1416, then a judgement is made that it is the time to switch the skid control cycle from the RELEASE mode cycle period to the HOLD mode cycle period because the wheel acceleration $\alpha$ is held greater than the wheel acceleration threshold $+\alpha_1$ and the operational mode is held in the RELEASE mode. Then, the HOLD mode cycle period is commanded at a step 1418. After commanding the HOLD mode cycle period, the process goes to END.

On the other hand, when the wheel acceleration $\alpha$ as compared with the wheel acceleration threshold $+\alpha_1$ at the step 1414, is smaller than the acceleration threshold $+\alpha_1$, then the wheel acceleration $\alpha$ is checked with a predetermined wheel deceleration threshold $-\alpha_2$ at a step 1420. When the wheel acceleration $\alpha$ as checked at the step 1420 is smaller than the wheel deceleration threshold $-\alpha_2$, it means that the braking condition requires anti-skid control. Then, at a step 1422, the HOLD mode cycle period is commanded for placing the pressure control valve 16 at the HOLD mode position, at a step 1424.

If the wheel acceleration $\alpha$ as compared with the wheel deceleration threshold $-\alpha_2$ at the step 1420 is greater than the wheel deceleration threshold, the skid control state indicative flag AS is checked at a step 1426. If the skid control mode indicative flag AS is not set as checked at the step 1426, the process goes to the step 1408. On the other hand, when the skid control state indicative flag AS is not set as checked at the step 1426, the CONTROLLED APPLICATION mode cycle period is commanded at a step 1426.

On the other hand, when wheel slippage Si as checked at the step 1402 is greater than or equal to the wheel slippage threshold $S_0$, then the wheel acceleration $\alpha$ is compared with the wheel acceleration threshold $+\alpha_1$ at a step 1430. When the wheel acceleration $\alpha$ as checked at the step 1430 is greater than or equal to the wheel acceleration threshold $+\alpha_1$, judgment can be made that the condition does not satisfy performing the RELEASE mode skid control cycle period operation. Therefore, the RELEASE mode timer value L is cleared at a step 1432. On the other hand, when the wheel acceleration $\alpha$ as checked at the step 1430 is smaller than the wheel acceleration threshold $+\alpha_1$, judgement can be made that a condition for performing the RELEASE mode skid control mode cycle period is satisfied. Therefore, at a step 1434, the RELEASE mode timer value L is set at a predetermined initial timer value $L_0$ which represents a period to maintain RELEASE mode skid control cycle period after the wheel slippage Si is decreased across the wheel slippage threshold $S_0$. At the same time, the skid control state indicative flag AS is set.

When the RELEASE mode timer value L as checked at the step 1404 is greater than zero (0), then, the RELEASE mode timer value L is decremented by one (1) at a step 1436 and thereafter the process moves to the step 1406. When the RELEASE mode timer value L as decremented at the step 1436 is still held greater than zero (0), the answer at the step 1412 becomes positive since the RELEASE mode timer value is greater than zero. Then, the process goes to a step 1438.

The example of practical operation of anti-skid control performed through the routine of FIG. 7 will be discussed herebelow with reference to FIGS. 8 and 9. It should be noted that, in FIG. 8, the solid line shows variation of wheel speed $Vw_3$ and $Vw_4$ of the rear wheels; the one-dot line shows variation of wheel speed $Vw_1$ and $Vw_2$ of the front wheels; and the broken line shows variation of the vehicle body speed representative data $V_{ref}$.

At the initial stage of braking operation starting at the time $t_0$, the wheel acceleration $\alpha$ is decreased across the wheel deceleration threshold $\alpha_{ref}$ to switch the reset signal level from HIGH level to LOW level. This results in introduction of the longitudinal acceleration data $|Gx+A|$ for deriving the vehicle body speed representative data $V_{ref}$ by $$V_{ref} = Vw_{max} + \int (|Gx|+A)dt$$

through the steps 1012 to 1016. The wheel slippage Si is held smaller than the wheel slippage threshold $S_0$. Therefore, the answer in the step 1402 is held negative. At this time, since the anti-skid control is not yet initiated, the RELEASE mode timer value L is maintained zero (0). Therefore, the answer at the step 1404 also becomes negative. Since the brake is applied, the answer in the step 1406 is negative to indicate that the condition for satisfying termination of the anti-skid control is not established.

Figure 8:
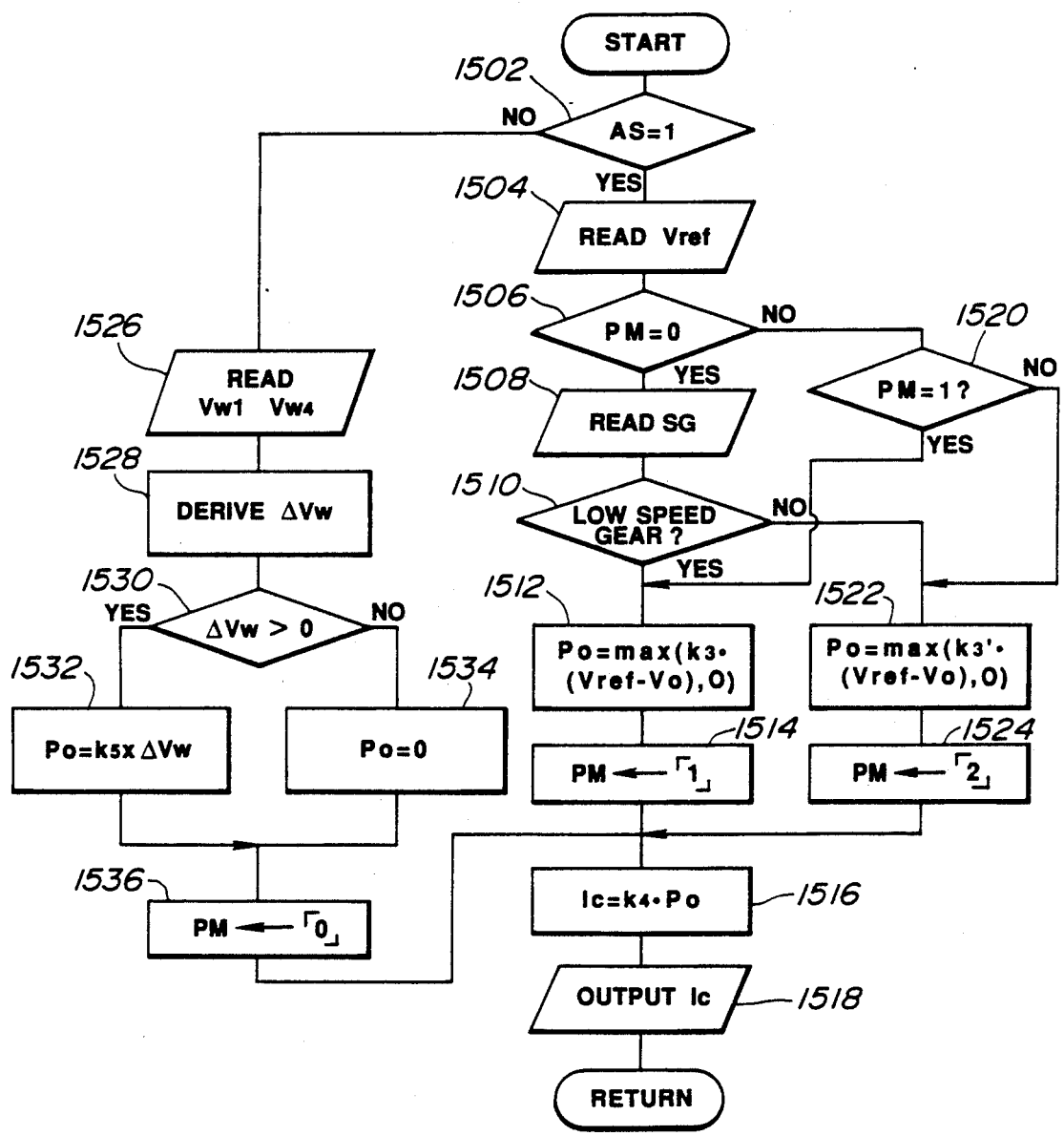
FIG. 8 is a flowchart showing an interrupt routine for selecting the operation mode of the power train depending upon a projected vehicle body speed.

FIG. 8 shows a routine for deriving the power train control signal Ic for adjusting the set pressure P of the proportioning valve 66 of the pressure supply unit 56. Similarly to the other routines, this routine is triggered cyclically or periodically with predetermined time intervals.

In practical execution, the skid control state indicative flag AS is initially checked at a step 1502 to check whether the current vehicular condition is an active state for the anti-skid brake control. When the anti-skid brake control is active and thus the answer at the step 1502 is positive, the vehicle body speed indicative data $V_{ref}$ is read at a step 1504. Thereafter, a target pressure set indicative flag PM is checked at a step 1506. The target pressure set indicative flag PM is set when the target pressure $P_0$ for the proportioning valve 66 is already set and otherwise maintained at a reset state.

If the target pressure set indicative flag PM is not set as checked at the step 1506, the transmission gear position indicative signal SG from the transmission gear position sensor 64 is read out at a step 1508. Based on the read transmission gear position indicative signal SG, a discrimination is as to made whether the transmission is in a low speed gear position, at a step 1510. If the transmission gear position is indeed in the low speed gear position as checked at the step 1510 and thus the answer is positive, the target pressure $P_0$ is calculated using the following formula, at a step 1512.

$$P_0 = \max(k_3 \times (V_{ref} - V_0), 0)$$

wherein
$k_3$ is a proportioning constant; and
$V_0$ is a predetermined vehicle body speed.
Then the target pressure set indicative flag PM is set at a value "one (1)" at a step 1514. Thereafter, at a step 1516, the power train control signal with the current level $I_0$ corresponding to the derived target pressure $P_0$ is derived using the following equation:

$$I_0 = k_4 \times P_0$$

wherein $k_4$ is a proportioning contact.

The power train control signal Ic having the current level derived at the step 1518 is output. Thereafter process goes END and returns to the background job. On the other hand, when the target pressure set indicative flag PM is other than zero (0) as checked at the step 1506, a check is performed against the target pressure set indicative flag as to whether the value of the target pressure indicative flag PM is one (1), at a step 1520. When value of the target pressure set indicative flag PM is one (1) and thus the answer at the step 1520 is positive, the process goes to the step 1512. If the transmission gear position as checked at the step 1510 is a high speed gear position and thus the answer is negative, then process goes to a step 1522 to derive the target pressure $P_0$ using the following formula:

$$P_0 = \max(k_3' \times (V_{ref} - V_0), 0)$$

wherein $k_3'$ is a proportioning constant which is smaller than $k_3$.

After deriving the target pressure $P_0$ at the step 1522, the target pressure set indicative flag PM is set at a value two (2) to indicate that that target pressure at the high speed gear position is set, at a step 1524. After the step 1524, the process goes to the step 1516.

On the other hand, when the target pressure set indicative flag PM as checked at the step 1520, then process goes to the step 1522. After the process performs step 1524, the process goes to the step 1516.

Through the process of the steps 1502 through 1524, the target pressure $P_0$ during anti-skid brake operation can be set. As will be appreciated, since the proportioning constant $k_3'$ set for the high speed gear position of the power transmission is smaller than that for the low speed gear position, the target pressure for the high speed gear position of the tranmission will be smaller than that of the low speed gear position. Therefore, even when the vehicular body speed is equal, the slip rate at the hydraulic clutch 55 is greater at the high speed gear position in order to distribute greater torque to the primary driving wheels than that to the auxirially driving wheels.

On the other hand, when the anti-skid brake control is not active as checked at the step 1502, then the wheel speed indicative data $Vw_1$, $Vw_2$, $Vw_3$ and $V_4$ are read at a step 1526. Then, a wheel speed difference $\Delta Vw$ between the front and rear wheels is calculated at a step 1528. In practice, calculation of the wheel speed difference $\Delta Vw$ is performed using the following equation:

$$\Delta Vw = (Vw_3 + Vw_4) - (Vw_1 + Vw_2)$$

Then, the wheel speed difference $\Delta Vw$ is checked whether the calculated value is greater than zero (0) at a step 1530. If the wheel speed difference $\Delta Vw$ is greater than zero as checked at the step 1530, the target pressure $P_0$ is calculated at a step 1532 using the following equation:

$$P_0 = k_5 \times \Delta Vw$$

wherein $k_5$ is a proportioning constant.

On the other hand, when the wheel speed difference $\Delta Vw$ is not greater than zero as checked at the step 1530, then the target pressure $P_0$ is set at zero (0), at a step 1534. After one of the step 1532 and 1534, process goes to the step 1516.

Figure 10:
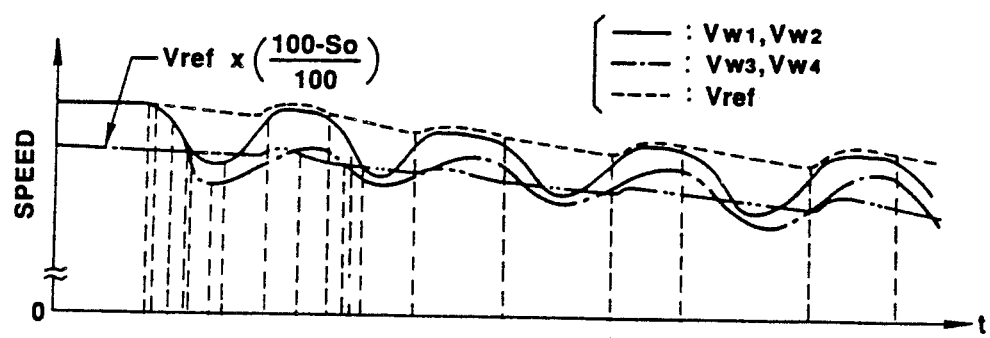
FIGS. 10(1)–10(7) are the timing charts showing operation of the preferred embodiment of the control system for controlling the anti-skid brake system and the power distribution control unit according to the invention.
Figure 10:
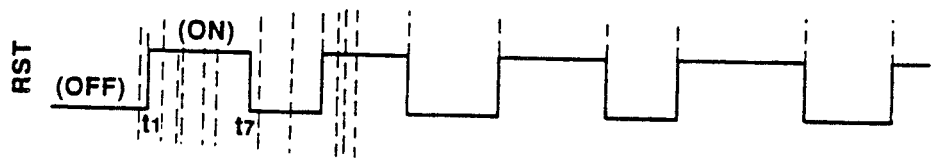
Figure 10:
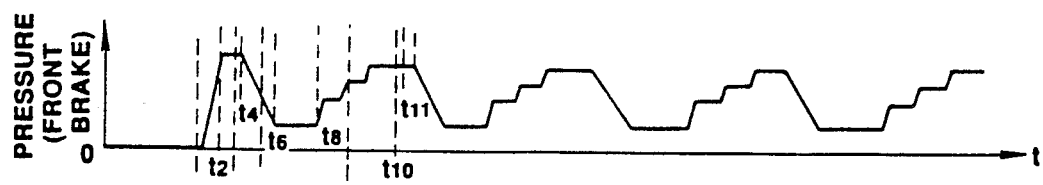
Figure 10:
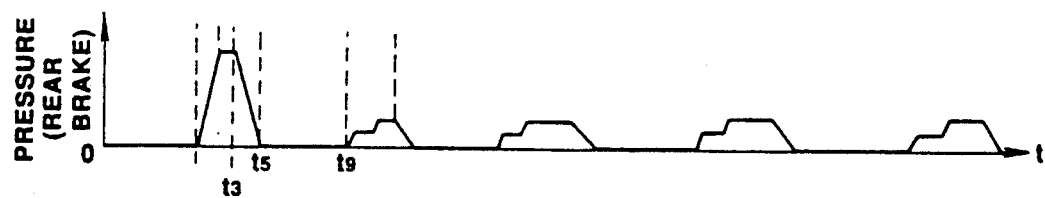
Figure 10:
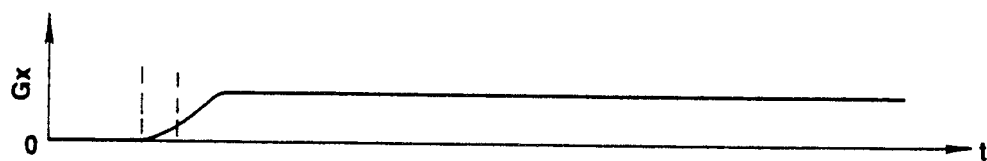
Figure 10:
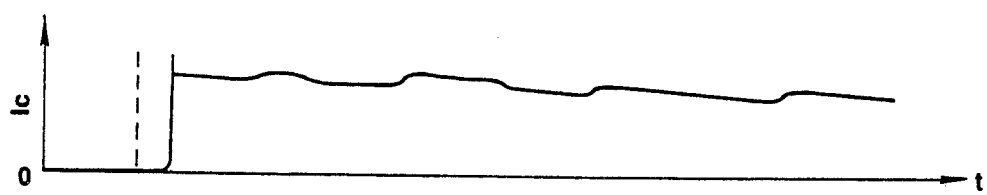
Figure 10:
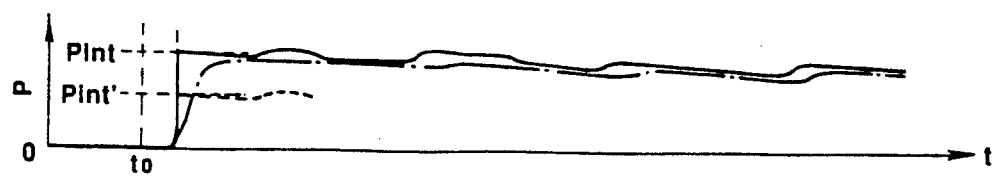

An example of the practical anti-skid brake control will be discussed herebelow with reference to FIG. 10. In order to simplify the discussion given herebelow, the assumption is made that the wheel speeds $Vw_1$ and $Vw_2$ of the front wheels are the same as each other and the wheel speeds $Vw_3$ and $Vw_4$ of the rear wheels are also the same as each other. Furthermore, the curves representative of respective speeds are shown in slightly offset form so as to avoid overlapping which makes it difficult to visually appreciate the variations. It is further assumed that the vehicle is driven in the operation mode of the power train selected in the two-wheel drive mode. The vehicle is assumed to travel on a slippy, low friction road, such as an icy road or snow road. At a time $t_0$, the brake pedal 6 is depressed for braking operation. At the time $t_0$, the wheel slippage Si is maintained smaller than the wheel slippage threshold $S_0$ and the wheel deceleration (negative value of wheel acceleration) is maintained smaller than the wheel deceleration threshold $-\alpha_2$, the NORMAL APPLICATION mode is commanded at the step 1410 of the routine of FIG. 7. Accordingly, the braking pressure in respective wheel cylinders 10FL, 10FR, 10RL and 10RR increases according to the building up of hydraulic pressure in the master cylinder 8. At the same time, since the longitudinal acceleration indicative data (positive value representing vehicular deceleration) Gx is maintained smaller than the longitudinal acceleration criterion $Gx_{ref}$ and the wheel slippage Si is naturally held smaller than the wheel slippage criterion $S_1$, therefore, the operation mode of the power train is maintained at the two-wheel drive mode.

Until the wheel acceleration $\alpha$ decreased to be smaller than the deceleration threshold $-\alpha_2$ is detected at the step 1410, the NORMAL APPLICATION mode is repeatedly commanded at the step 1410 for increasing the braking pressure in linear fashion as illustrated in the period $t_0$ to $t_2$. The wheel speed data $Vw_n$ thus starts to decrease with a certain lag time. During the period, in which NORMAL APPLICATION mode is maintained, the deceleration rate at the rear wheels become greater than that of the front wheels because of negative driving torque active on the rear wheels. Therefore, at the initial stage of braking operation, the NORMAL APPLICATION mode skid cycle is performed for a period a as indicated in FIG. 8. At a time $t_1$, the wheel acceleration $\alpha$ decreases across the deceleration threshold $-\alpha_{ref}$ and this causes the answer at the step 1012 of the routine of FIG. 3 to be positive. Therefore, HIGH level reset signal RST is output at the step 1014 for enabling the integrator circuit 26. Then, the integrator circuit 26 starts to integrate the longitudinal acceleration indicative data Gx to output the vehicle speed representative data $V_{ref}$. At a time $t_2$, the wheel acceleration $-\alpha$ is further decreased across the wheel deceleration threshold $-\alpha_2$ due to increased braking pressure in the wheel cylinders 10FL, 10FR, 10RL and 10RR.

Therefore, the answer in the step 1420 turns into positive. As a result, the HOLD mode skid control cycle period is commanded at the step 1424. Therefore, the anti-skid control system becomes active for performing anti-skid brake control operation. The HOLD mode skid control cycle period is maintained for a period until the wheel slippage Si is increased across the wheel slippage threshold $S_0$.

When the wheel slippage Si becomes greater than or equal to the wheel slippage threshold $S_0$ at a time $t_3$, the answer in the step 1402 becomes positive. At the initial stage of the RELEASE mode skid control cycle period, the wheel acceleration $\alpha$ is maintained smaller than the wheel acceleration threshold $+\alpha_2$. Therefore, the answer in the step 1430 becomes negative. This causes setting of the RELEASE mode timer value L to the initial value $L_0$ and setting of the skid control state indicative flag AS, at the step 1434. By setting the RELEASE mode timer value L to $L_0$, the answer in the step 1412 becomes positive to command RELEASE mode skid control cycle period at the step 1438.

The power train control is responsive to switching of the operational mode in anti-skid control from HOLD mode to RELEASE mode at the time $t_3$ to cause setting of the skid control state indicative flag AS. Therefore, target pressure $P_0$ is set based on the vehicle body speed representative data $V_{ref}$ and the transmission gear position as monitored by the transmission gear position sensor 64. As set forth, the target pressure $P_0$ is variable depending upon the vehicle body speed representative data and the transmission gear position as shown in FIG. 10(7). According to variation of the target pressure $P_0$, the current level of the power train control signal Ic varies as shown in FIG. 10(6). Therefore, according to variation of the control signal current level, the engaging pressure actually applied to the hydraulic clutch varies to vary the slip rate in the hydraulic clutch at a corresponding rate of the engaging pressure. Therefore, the power train operational mode becomes a controlled power distribution mode. As a result, the engine braking torque can be exerted for all four wheels for assisting vehicular deceleration.

Here, the maximum torque $|T_{max}|$ to be applied to the front wheels 55 by the hydraulic clutch can be illustrated by:

$$|T_{max}| = k_6 \times P$$

wherein $k_6$ is constant.

If the wheel speed difference is $(V_{w1}+V_{w2})>(V_{w3}+V_{w4})$, the torque to be transmitted to the front wheels can be illustrated by:

$$T_f = -T_{max}$$

On the other hand, if the wheel speed difference is $(V_{w1}+V_{w2})<(V_{w3}+V_{w4})$, the torque to be transmitted to the front wheels can be illustrated by:

$$T_f = T_{max}$$

Therefore, the equations of rotational motion of the front and rear wheels are:

$$I\omega_i = \mu_i \times W_i \times R - TQB_i + -Tf \quad (i=1, 2)$$

$$(I+I_E)\omega_i = \mu_i \times W_i \times R - TQB_i + -Tf - T_E \quad (i=3, 4)$$

wherein

I is inertia at the wheel;

$I_E$ is rotational inertia of the engine converted as an inertia at the drive shaft;

$\omega_i$ is angular acceleration at the wheel;

$\mu_i$ is $\mu$ at the road surface;

$W_i$ is load at the wheel;

TQB is a braking torque;

Tf' is Tf as converted as torque at the drive shaft; and $T_E$ is an engine braking torque converted as torque at the drive shaft.

Therefore, as shown, when the front wheel speed is higher than the rear wheel speed, the torque is transmitted to the front wheels 9FL and 9FR as braking torque since Tf' is smaller than zero. At the same time, the torque is applied to the rear wheels 9RL and 9RR as a driving torque. Therefore, the engine braking torque is distributed not only to the rear wheels but also the front wheels. As a result, the engine braking torque to be exerted on the rear wheels can be reduced for permitting quicker recovery of the wheel speed at the rear wheels.

In the shown example, by splitting the engine braking torque between the front and rear wheels, the wheel acceleration $\alpha$ at the rear wheels becomes greater than or equal to the wheel acceleration threshold $+\alpha_1$ and the skid control state indicative flag AS is set, the HOLD mode skid control cycle period is commanded at the step 1418 at a time $t_5$. Subsequently, the wheel acceleration $\alpha$ of the front wheel becomes greater than or equal to the wheel acceleration threshold $+\alpha_1$ to place the skid control cycle period at the HOLD mode.

During the HOLD mode skid control cycle period, wheel speed $V_{wn}$ continues to increase with the result that the maximum wheel speed indicative data $V_{wmax}$ becomes greater than or equal to the vehicle body speed representative data $V_{ref}$ at a time $t_7$. This causes the positive answer at the step 1018. Therefore, the reset signal RST is turned into a HIGH level at the step 1020, and the skid cycle indicative flag F1 is reset at the step 1022 of the routine of FIG. 3. Subsequently, at a time $t_8$, the wheel speed at the front wheels 9FL and 9FR drops below the vehicle body speed representative data value to place the operational mode cycle period in the APPLICATION mode for the front wheels. As seen from FIG. 10, since the wheel speed at the rear wheels 9RL and 9RR is held higher than the vehicle body speed representative data value, the operational mode cycle period for the rear wheels is maintained at the HOLD mode at the time $t_8$. At a time $t_9$ the wheel speed at the rear wheels 9RL and 9RR drops below the vehicle body speed representative data value to place the operational mode cycle period in the APPLICATION mode for the rear wheels. Since the reset signal RST is maintained at a LOW level and the skid cycle cycle indicative flag F1 is held in a reset state until the wheel acceleration $\alpha$ of the rear wheels is again decreased to the wheel deceleration threshold $\alpha_{ref}$. The vehicle body speed representative data $V_{ref}$ is derived at a value corresponding to the maximum wheel speed indicative data $V_{wmax}$. The period in which the vehicle body speed representative data $V_{ref}$ is derived at the value corresponding to the maximum wheel speed indicative data $V_{wmax}$ is illustrated as a period a' in the timing chart of FIG. 10.

By maintaining the skid control cycle at the HOLD mode skid control cycle period as set forth, the wheel acceleration $\alpha$ is decreased across the wheel acceleration threshold $+\alpha_1$. Then, the CONTROLLED APPLICATION mode skid control cycle period is commanded at the step 1428 since the skid control state indicative flag AS is held in a set position. The CONTROLLED APPLCIATION mode is maintained until times $t_{10}$ and $t_{11}$ at front and rear wheels.

Through the process as set forth above, precise brake control becomes possible. Furthermore, according to the present invention, since the longitudinal acceleration indicative data is provided the predetermined offset value for increasing the deceleration at a given level, avoidance of a no braking state can be assured.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the embodiments showns which can be embodied without departing from the principle of the invention set out in the appended claims.

For example, although the specific technologies have been disclosed hereinbefore in terms of the preferred embodiment of the present invention, the technologies disclosed in the following United States Patents, all owned by the common assignee to the present invention:

U.S. Pat. No. 4,408,290, issued on Oct. 4, 1983
U.S. Pat. No. 4,674,049, issued on June 16, 1987
U.S. Pat. No. 4,704,684, issued on Nov. 3, 1987
U.S. Pat. No. 4,663,715, issued on May 5, 1987
U.S. Pat. No. 4,663,716, issued on May 5, 1987
U.S. Pat. No. 4,660,146, issued on Apr. 21, 1987
U.S. Pat. No. 4,665,491, issued on May 12, 1987
U.S. Pat. No. 4,780,818, issued on Oct. 25, 1988
U.S. Pat. No. 4,674,050, issued on June 16, 1987
U.S. Pat. No. 4,680,714, issued on July 14, 1987
U.S. Pat. No. 4,682,295, issued on July 21, 1987
U.S. Pat. No. 4,680,713, issued on July 14, 1987
U.S. Pat. No. 4,669,046, issued on May 26, 1987
U.S. Pat. No. 4,669,045, issued on May 26, 1987
U.S. Pat. No. 4,679,146, issued on July 7, 1987
U.S. Pat. No. 4,656,588, issued on Apr. 7, 1987
U.S. Pat. No. 4,718,013, issued on Jan. 5, 1988
U.S. Pat. No. 4,569,560, issued on Feb. 11, 1986
U.S. Pat. No. 4,662,686, issued on May 5, 1987
U.S. Pat. No. 4,667,176, issued on May 19, 1987
U.S. Pat. No. 4,597,052, issued on June 24, 1986
U.S. Pat. No. 4,637,663, issued on Jan. 20, 1987
U.S. Pat. No. 4,683,537, issued on July 28, 1987
U.S. Pat. No. 4,809,182, issued on Feb. 28, 1989
U.S. Pat. No. 4,805,103, issued on Feb. 14, 1989 will be applicable for implementing the present invention. Furthermore, the technology for cooperating with the power train control for switching operation of the power train between the four-wheel drive mode and the two wheel drive mode may be applicable not only for anti-skid brake control system but also for traction control technologies utilizing technologies close to anti-skid brake control. For example, traction control technologies have been disclosed in the following United States Patents which are also owned by the common owner of the present invention:

U.S. Pat. No. 4,763,912, issued on Aug. 16, 1988
U.S. Pat. No. 4,771,850, issued on Sept. 20, 1988.

The completeness of the above-identified United States Patents will be herein incorporated by reference for the sake of disclosure.

What is claimed is:

1. A combination comprising:
    a power train control system associated with an automotive internal combustion engine for distributing driving torque generated by said engine to primary and secondary wheels, said power train control system being operative for adjusting power distribution between said primary and secondary wheels in such a manner that full power is distributed to said primary wheels in a two wheel drive mode and even power is distributed in a complete four wheel drive mode, said power distribution being varied between said two wheel drive mode and said complete four wheel drive mode;
    an anti-skid brake control system for controlling braking pressure for maintaining wheel slippage in the vicinity of a predetermined optimum level, said antiskid control system comprising
        a braking circuit connecting a pressurized fluid source to a wheel cylinder for each of said front and rear wheels for building up braking pressure in said wheel cylinder,
        pressure control valve means, disposed in said braking circuit, for controlling braking pressure in said wheel cylinder, said pressure control valve means operable for increasing braking pressure in said wheel cylinder in a first mode and decreasing braking pressure in said wheel cylinder in a second mode,
        a first sensor for monitoring rotation speed of an associated one of said primary and secondary wheels for producing a wheel speed indicative signal;
        second means for deriving said wheel slippage on the basis of said wheel speed indicative signal and producing wheel slippage data;
        third means for producing a first control signal for controlling operation modes of said pressure control valve means for switching said operation modes between said first mode and said second mode in order to maintain said wheel slippage in the vicinity of said predetermined optimum level on the basis of said wheel slippage data; and
        fourth means for controlling said power train control system for adjusting said power distribution depending upon a preselected vehicle driving parameter including vehicle body speed representative data derived from said wheel speed indicative signal, said fourth means being active for selecting an increased power distribution ratio for said secondary wheels depending upon an increased value of said vehicle body speed representative data during an active state of said third means.

2. A combination as set forth in claim 1, which further comprises:
    fifth means for detecting a gear position of a power transmission for producing a gear position indicative signal; and
    said fourth means adjusting said power distribution depending upon said gear position of said power transmission.

3. A combination as set forth in claim 2, wherein said fourth means selects a smaller value of said power distribution for said secondary wheels at a low speed gear position of said power transmission than a value selected at a high speed gear position.

4. A combination as set forth in claim 1, wherein said power train control system varies said power distribution between said two wheel drive mode and said complete four wheel drive mode in a linear fashion.

5. A combination as set forth in claim 4, wherein said power train control system comprises clutch means associated with pressure means for adjusting an engaging pressure of said clutch means in order to achieve said power distribution ratio selected by said fourth means.

6. A combination as set forth in claim 5, wherein said fourth means produces a power train control signal having a value representative of said power distribution, and said pressure means includes means for linearly adjusting said engaging pressure of said clutch means.

7. A combination as set forth in claim 1, wherein said anti-skid brake control system controls said pressure control valve means for respective primary and secondary wheels independently of each other.

8. A combination comprising:

a power train control system associated with an automotive internal combustion engine for distributing driving torque generated from said engine to primary and secondary driving wheels, said power train control system being operative for adjusting power distribution between said primary and secondary driving wheels in such a manner that full power is distributed to said primary driving wheels in a two wheel drive mode and even power is distributed in a complete four wheel drive mode, said power distribution being varied between said two wheel drive mode and said complete four wheel drive mode;

an anti-skid brake control system for controlling braking pressure for maintaining wheel slippage in the vicinity of a predetermined optimum level, said anti-skid control system comprising a brake circuit connecting a pressurized fluid source to a wheel cylinder for each of said primary and secondary wheels for building up braking pressure in said wheel cylinder, pressure control valve means, disposed in said brake circuit, for controlling said braking pressure in said wheel cylinder, said pressure control valve means operable for increasing said braking pressure in said wheel cylinder in a first mode and decreasing said braking pressure in said wheel cylinder in a second mode, a first sensor for monitoring rotation speed of an associated one of said primary and secondary wheels for producing a wheel speed indicative signal and second means for deriving wheel slippage on the basis of said wheel speed indicative signal and producing wheel slippage data;

third means for producing a first control signal for controlling operation modes of said pressure control valve means for switching said operation modes between said first mode and said second mode in order to maintain said wheel slippage in said vicinity of said predetermined optimum level, on the basis of said wheel slippage data; and fourth means for controlling said power train control system for adjusting said power distribution depending upon a preselected vehicle driving parameter including vehicle body speed indicative data derived from said wheel speed indicative signal, said fourth means being responsive to initiation of operation of said third means, for setting an initial value of said power distribution for said secondary wheels at a predetermined ratio which is variable depending upon said vehicle body speed indicative data so as to adjust said power distribution for said secondary wheels on the basis of said initial value of said power distribution and variation of said vehicle body speed indicative data.

9. A combination comprising:

a power train control system associated with an automotive internal combustion engine for distributing driving torque generated by said engine to primary and secondary driving wheels, said power train control system being operative for adjusting power distribution between said primary and secondary driving wheels in such a manner that full power is distributed to said primary driving wheels in a complete four wheel drive mode, said power distribution being varied between said two wheel drive mode and said complete four wheel drive mode;

an anti-skid brake control system for controlling braking pressure for maintaining wheel slippage in the vicinity of a predetermined optimum level, said anti-skid control system comprising a brake circuit connecting a pressurized fluid source to a wheel cylinder for each of said primary and secondary wheels for building up braking pressure in said wheel cylinder, pressure control valve means, disposed in said brake circuit, for controlling braking pressure in said wheel cylinder, said pressure control valve means operable for increasing said braking pressure in said wheel cylinder in a first mode and decreasing said braking pressure in said wheel cylinder in a second mode, a first sensor for monitoring a rotation speed of an associated one of said primary and secondary wheels for producing a wheel speed indicative signal and second means for deriving said wheel slippage on the basis of said wheel speed indicative signal and producing wheel slippage data;

third means for producing a first control signal for controlling operation modes of said pressure control valve means for switching said operation modes between said first mode and said second mode in order to maintain said wheel slippage in said vicinity of said predetermined optimum level, on the basis of said wheel slippage data; and fourth means for controlling said power train control system for adjusting said power distribution depending upon a preselected vehicle driving parameter including vehicle body speed indicative data derived from said wheel speed indicative signal, said fourth means being responsive to initiation of operation of said third means, for setting an initial value of said power distribution for said secondary wheels at a predetermined ratio which is variable depending upon said vehicle body speed indicative data and decreasing said power distribution for said secondary wheels according to a decrease of said vehicle body speed indicative data.

* * * * *